United States Patent
Ng et al.

(10) Patent No.: US 7,471,522 B2
(45) Date of Patent: Dec. 30, 2008

(54) LIGHT LOAD REGULATOR FOR ISOLATED FLYBACK CONVERTER

(75) Inventors: David R. Ng, San Jose, CA (US); Michael G. Negrete, Palo Alto, CA (US)

(73) Assignee: Linear Technology Corporation, Milpitas, CA (US)

( * ) Notice: Subject to any disclaimer, the term of this patent is extended or adjusted under 35 U.S.C. 154(b) by 274 days.

(21) Appl. No.: 11/498,130

(22) Filed: Aug. 3, 2006

(65) Prior Publication Data

US 2008/0031017 A1 Feb. 7, 2008

(51) Int. Cl.
*H02M 3/335* (2006.01)

(52) U.S. Cl. ...................... 363/21.12; 363/97

(58) Field of Classification Search ............... 363/20, 363/21.01, 21.02, 21.18, 78, 79, 80, 95, 97, 363/131, 21.12
See application file for complete search history.

(56) References Cited

U.S. PATENT DOCUMENTS 6,434,021 B1 * 8/2002 Collmeyer et al. ....... 363/21.01

7,352,595 B2 * 4/2008 Yang et al. ............... 363/21.13
2006/0158909 A1 * 7/2006 Hawley .................... 363/21.12
2008/0031018 A1 * 2/2008 Negrete .................... 363/21.17

OTHER PUBLICATIONS

"1-Cell to 3-Cell, High-Power (1.5A), Low-Noise, Step-Up DC-DC Converter," Maxim Integrated Products, 19-1336, Rev. 2; Nov. 1998, p. 1.
"800-mA Synchronous Step-Down Converter," Texas Instruments Incorporated, SLVS432D, Sep. 2002—Revised Oct. 2003.
"High-integrated Green-mode PWM Controller," System General Corp, SG6841, Version 1.9, Apr. 6, 2004, p. 1.
"Reducing standby power consumption," Tso-Min Chen, System General Corp. (3 pages), no date.
Co-pending U.S. Appl. No. 11/499,726, filed Aug. 7, 2006.

* cited by examiner

Primary Examiner—Adolf Berhane
(74) Attorney, Agent, or Firm—McDermott Will & Emery LLP (57) ABSTRACT

A regulator may include a load voltage sensing circuit configured to generate a feedback signal representative of output voltage from an isolated flyback converter. The regulator may include a pulse generator configured to controllably generate the pulses and to increase at least one off time and at least one period of the pulses after a load on the flyback converter decreases.

30 Claims, 5 Drawing Sheets

LIGHT LOAD REGULATOR FOR ISOLATED FLYBACK CONVERTER

BACKGROUND

1. Field

This disclosure pertains to regulators for power supplies and, more particularly, to regulators for isolated flyback converters.

2. Description of Related Art

Power supplies used in telecommunications, health care, industry, and other applications may require electrical isolation between the input to the supply and the output from the supply. A transformer is often used to provide this isolation.

The transformer may be placed in a configuration known as a flyback converter. A flyback converter often regulates the output of the power supply by controlling a series of pulses that are delivered to the primary winding of the transformer. When the output needs to be increased, the on-time of the pulses may be increased. Conversely, when the output needs to be decreased, the on-time of the pulses may be reduced.

The output of the power supply is usually sensed to determine how the pulses need to be altered to achieve a desired value. When complete electrical isolation must be maintained between the input and the output of the power supply, this sensing may also need to be done in an electrically-isolated manner.

To achieve this electrical isolation, an opto-isolator is sometimes used to relay the output level back to the input control system. The feedback in this configuration utilizes an optical path over which electrons cannot travel. Opto-isolators, however, can increase the size of the power supply, increase costs, and may limit the ability of the power supply to make needed adjustments quickly.

Another technique is to monitor the voltage on the primary winding of the transformer in the flyback converter. This is commonly referred to as "primary side sensing." This monitoring has typically been done during off periods of the pulses when the primary winding has been disconnected from the supply voltage and current is flowing through the secondary winding of the transformer. This technique works due to inherent characteristics of the transformer. These inherent characteristics cause the voltage across the primary winding during this period to be approximately equal to the output voltage of the power supply, times the ratio of turns in the primary winding to the turns in the secondary winding.

The output regulation that is accomplished using primary side sensing, however, may not be adequate. For example, the regulator may not be able to maintain the output voltage at a constant level when the load on the supply gets too low. To avoid this potential problem, isolated flyback converters are sometimes designed so that they always draw a minimum amount of current. This can be wasteful of energy.

SUMMARY

A regulator may be configured to regulate a flyback converter having a transformer with a primary winding and a secondary winding and a switching circuit for controllably delivering energy into the primary winding in response to pulses.

The regulator may include a load voltage sensing circuit configured to generate a feedback signal representative of output voltage from the isolated flyback converter.

The regulator may also include a pulse generator configured to controllably generate the pulses and to increase at least one off time and at least one period of the pulses after a load on the flyback converter decreases.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
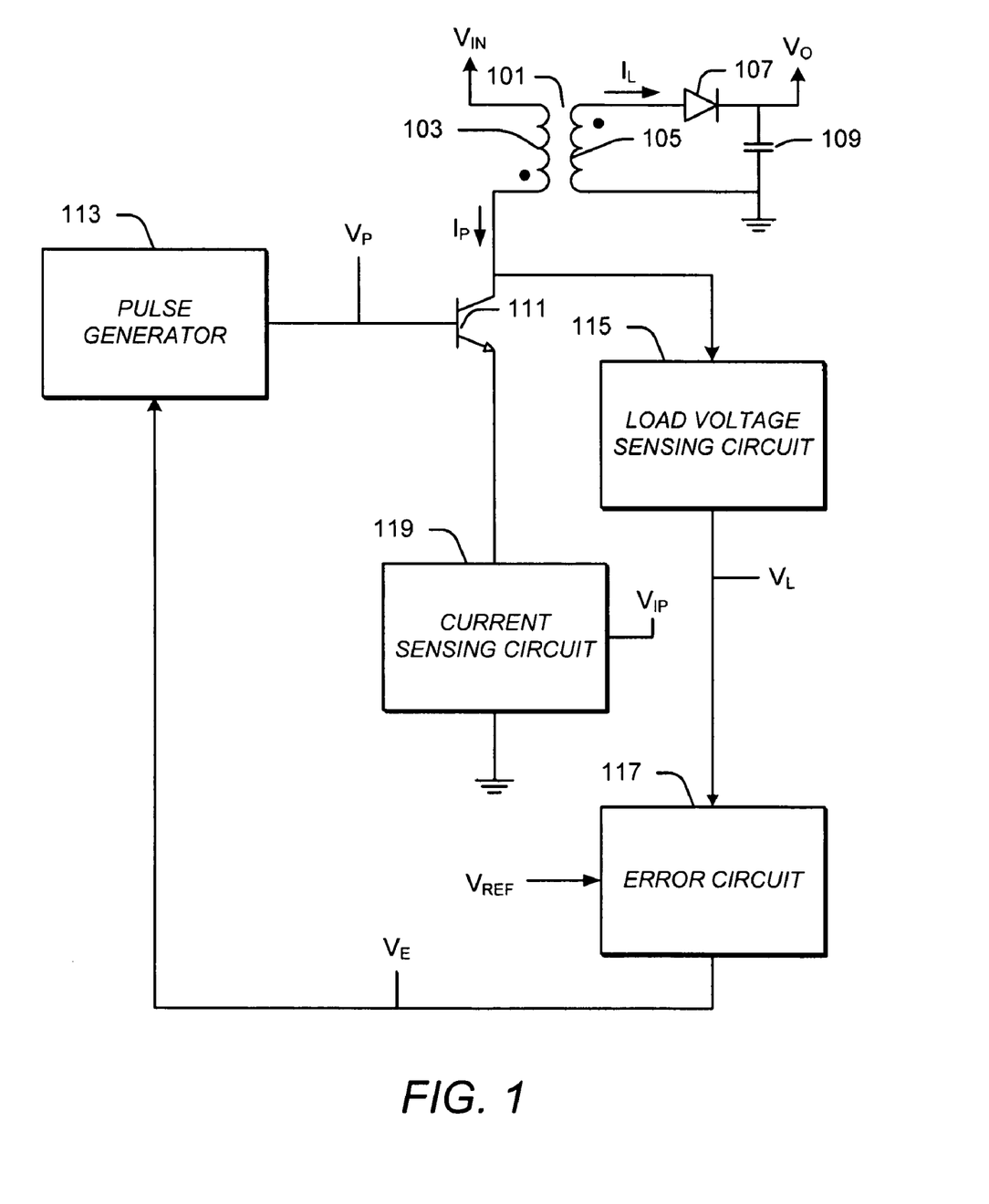
FIG. 1 illustrates portions of an isolated flyback converter using primary winding sensing and a regulator.

FIG. 1 illustrates portions of an isolated flyback converter using primary winding sensing and a regulator.

As shown in FIG. 1, the converter may include a transformer 101 having a primary winding 103 and a secondary winding 105. The primary winding 103 and the secondary winding 105 may be configured so as to be out of phase with one another, as reflected by the opposing dots on the schematic symbol for the transformer 101 in FIG. 1.

The secondary winding 105 may be connected to a rectifying diode 107 and a filtering capacitance 109.

The rectifying diode 107 may be of any type. For example, it may be a Schottky diode. Similarly, the filtering capacitance 109 may be of any type. Numerous other types of rectifying and/or filtering circuits may be used in addition or instead. For example, multiple secondary windings may be used, each with their own rectifying diode and capacitance, to generate multiple output voltages.

The primary winding 103 may be connected to an energy supplying circuit. For example, one of the leads to the primary winding 103 may be connected to a source of energy, such as $V_{IN}$, while the other lead may be connected to a switching circuit, such as a transistor 111. Other types of switching circuits may be used in addition or instead, such as switching circuits that use MOSFETs and/or any other type of controllable switch or switches.

A pulse generator 113 may be used to drive the switching circuit, such as to drive the transistor 111. The pulse generator 113 may be configured to deliver a series of pulses $V_P$ to the switching circuit, thus causing the primary winding 103 of the transformer 101 to be repeatedly coupled to and decoupled from the energy-supplying circuit.

The pulse generator 113 may be configured to vary the timing of the pulses that are delivered to the switching circuit, thus varying the amount of energy that is delivered into the transformer 101. In turn, this may affect the output voltage $V_O$ of converter.

Due to inherent characteristics of the transformer 101 and as explained above, the voltage on the primary winding 103 may contain information indicative of the output voltage $V_o$ from the converter. This may occur when the pulses from the pulse generator 113 are off, that is, when the transistor 111 is not conducting, and when load current $I_L$ is traveling through the secondary winding 105. During these periods, the voltage across the primary winding 103 may be approximately equal to $V_{IN}+V_O$, times the ratio of the turns in the primary winding 103 to the turns in the secondary winding 105.

A load voltage sensing circuit 115 may be configured to derive a load voltage $V_L$ from the voltage on the primary winding 103 that is representative of the output voltage $V_O$. More specifically, the load voltage sensing circuit 115 may be configured to shift the level on the lead of the primary winding 103 to which it may be connected by subtracting $V_{IN}$ from the voltage on this lead. In addition to level shifting, the load voltage sensing circuit 115 may be configured to scale the level of the shifted value.

The load voltage $V_L$ that is sensed by the load voltage sensing circuit 115 may be supplied to an error circuit 117. The error circuit 117 may be configured to compare a reference voltage $V_{REF}$ with the load voltage $V_L$ and to output an error voltage $V_E$ representing the approximate difference between the reference voltage $V_{REF}$ and the load voltage $V_L$. The error voltage $V_E$ may be supplied to the pulse generator 113 and may be utilized by the pulse generator 113, along with other information discussed below, for the purpose of regulating the timing of the voltage pulses $V_P$ that it generates. Examples of such timing are discussed below in connection with FIGS. 2-5.

A current sensing circuit 119 may be configured to sense the primary winding current $I_P$ that is traveling through the primary winding 103 and to generate a voltage $V_{IP}$ that is representative of the primary winding current $I_P$. Examples of how $V_{IP}$ may be used are described below.

The pulse generator 113, the load voltage sensing circuit 115, the error circuit 117, and the current sensing circuit 119 may be configured to perform one or more of the functions that are ascribed to them herein, as well as other functions. They may be constructed using any combination of appropriate circuitry components, all in accordance with well-known techniques. Examples of such components will now be described, along with examples of signals that they may generate.

Figure 2:
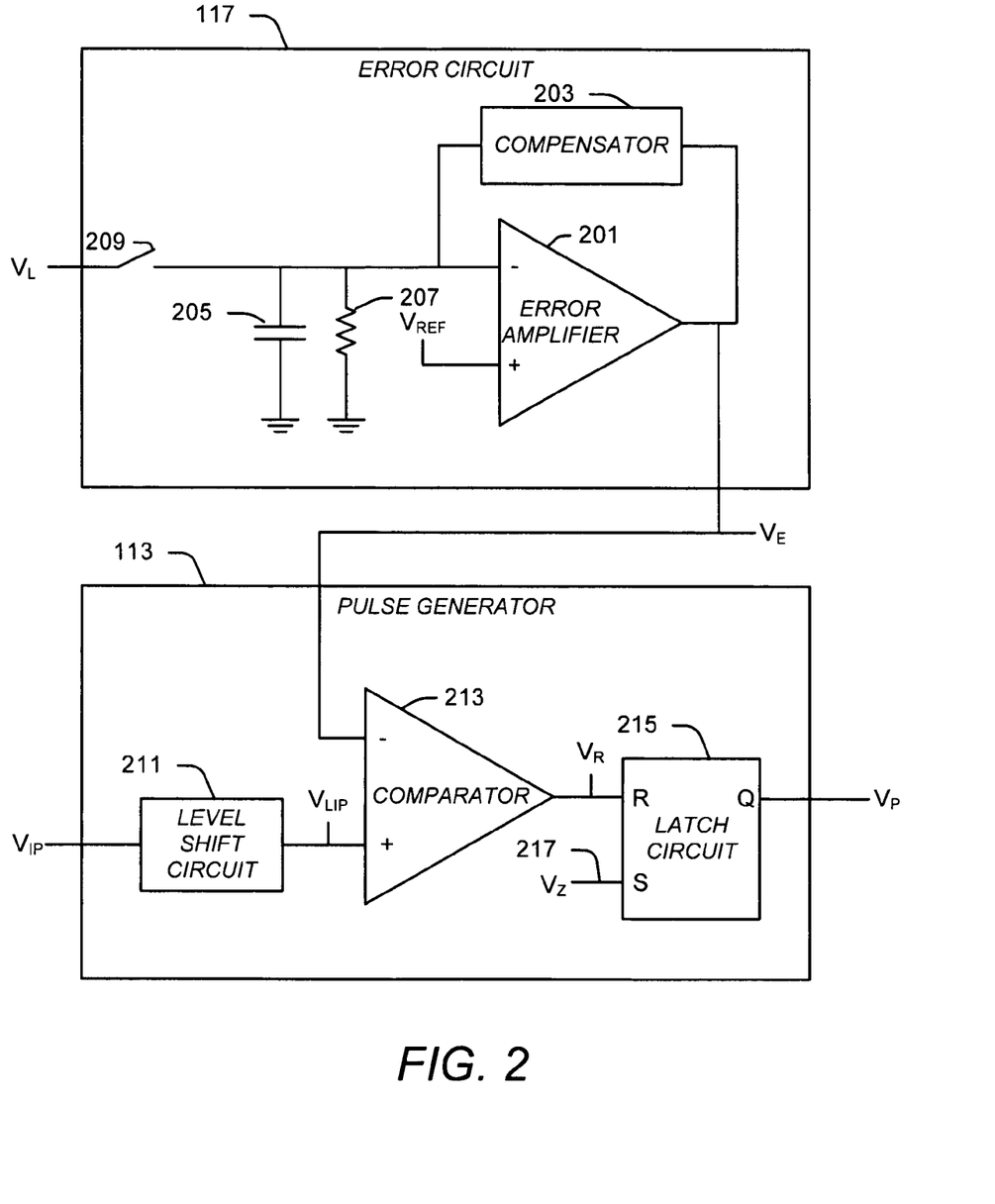
FIG. 2 illustrates components that may be used for portions of the isolated flyback converter illustrated in FIG. 1.

FIG. 2 illustrates components that may be used for portions of the isolated flyback converter illustrated in FIG. 1.

As shown in FIG. 2, the error circuit 117 may include an error amplifier 201, a compensator 203, an RC network that includes a capacitance 205 and a resistance 207, and a controllable switch 209.

A characteristic that may be inherent in the isolated flyback converter shown in FIG. 1 is that the sensed load voltage $V_L$ may only be representative of the output voltage $V_O$ when current is flowing in the secondary winding 105, but not the primary winding 103. The controllable switch 209 may be configured and driven so that it causes the load voltage $V_L$ to be sampled by the capacitance 205 only during such periods of time when the load voltage $V_L$ is representative of the output voltage $V_O$, namely while the secondary winding 105 is conducting current, but the primary winding 103 is not.

Any type of circuitry may be used to implement and control the controllable switch 209 to effectuate this sample timing. Examples are set forth in co-pending U.S. patent application No. 11/499,726, filed Aug. 7, 2006, entitled "Regulator for Isolated Flyback Power Supply Using Primary Side Sensing," the entire content of which is incorporated herein by reference.

The error amplifier 201 may be any type of amplifier, such as a differential operational amplifier. The error amplifier 201 may be configured so as to generate an error voltage $V_E$ that is approximately proportional to the difference between the reference voltage $V_{REF}$ and the sampled load voltage $V_L$ when that difference is positive. When the difference is negative, the error amplifier 201 may be configured to generate an error voltage $V_E$ that is approximately zero. The compensator 203 may be configured in accordance with well-known techniques to regulate the gain and response characteristics of the error amplifier 201 as may be needed for it to perform the functions described here.

The pulse generator 113 may include a level shift circuit 211, a comparator 213 and a latch circuit 215.

The level shift circuit 211 may be configured in accordance with well-known techniques to shift the level of the voltage $V_{IP}$ that is representative of the primary winding current $I_P$ so that it always has a positive value.

The comparator 213 may be configured to compare the level-shifted voltage $V_{LIP}$ with the error voltage $V_E$ and to be coupled to reset input R of the latch circuit 215, thus holding the latch circuit 215 in its reset state whenever the level-shifted voltage $V_{LIP}$ is greater than the error voltage $V_E$.

The latch circuit 215 may include a set input S that may be coupled to a load current zero crossing voltage $V_Z$. Using well-known techniques, $V_Z$ may be generated by a circuit (not shown) that causes $V_Z$ to rise approximately each time the load current $I_L$ ceases to flow and to fall approximately each time the transistor 111 turns on.

The latch circuit 215 may be configured so as to cause a high input to its reset input R to take precedence over a high input to its set input S. Such a latch circuit is commonly referred to as a "reset dominant" latch circuit.

Figure 3:
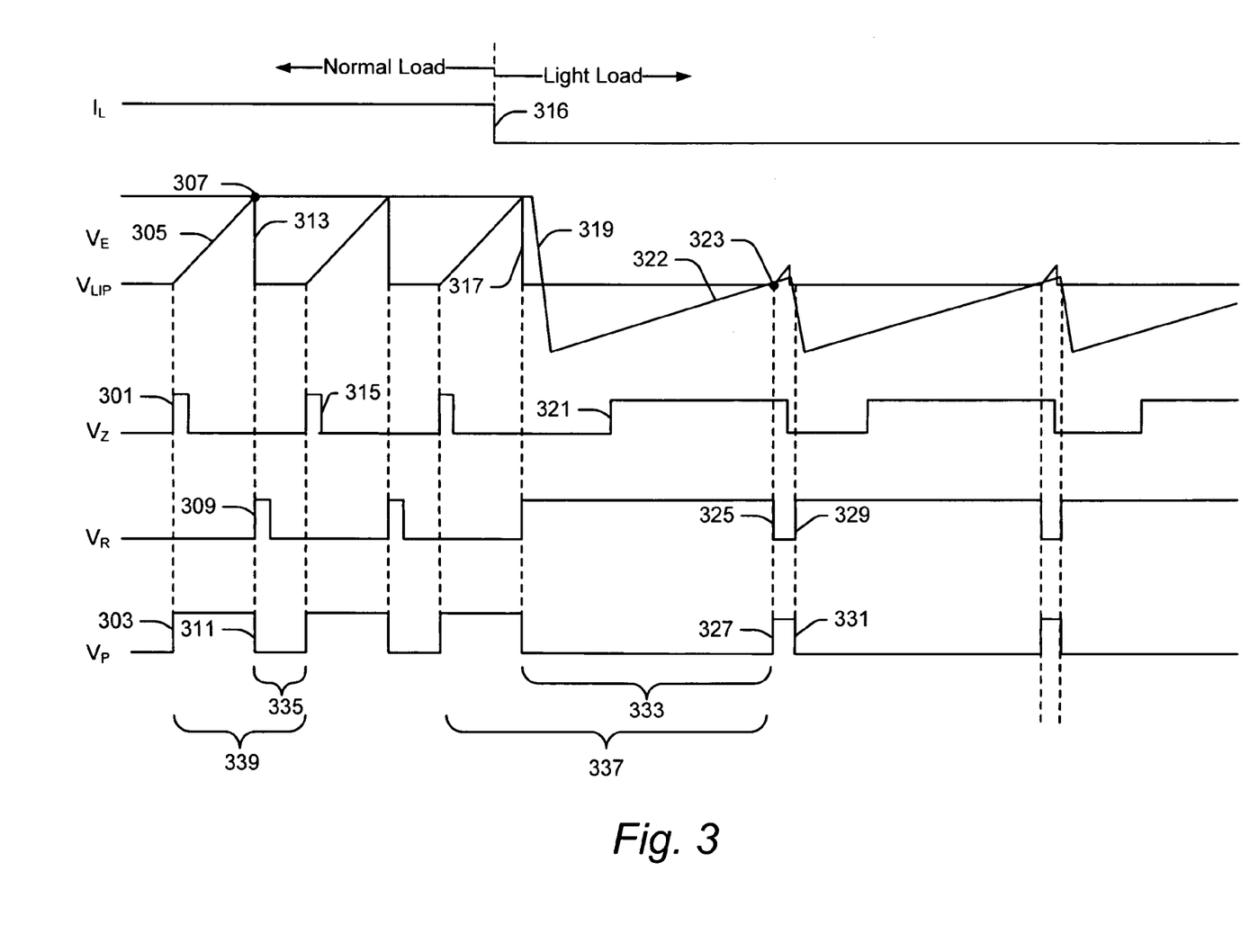
FIG. 3 illustrates signals that may be found in one or more of the circuits illustrated in FIGS. 1 and 2.

FIG. 3 illustrates signals that may be found in one or more of the circuits illustrated in FIGS. 1 and 2.

As shown in FIG. 3, $I_L$ may vary. Sometimes, for example, $I_L$ may be representative of a moderate-to-heavy load on the voltage output $V_O$, while at other times it may be representative of a light load on the voltage output $V_O$.

The precise demarcation between what is a moderate-to-heavy load and a light load may vary. It may, for example, depend upon the particular selection and configuration of components that are used.

During moderate-to-heavy loads, the output voltage $V_O$ is likely to be slightly below the desired voltage, thus ensuring that the flyback converter continues to pump energy into the transformer 101 to replenish the energy in the capacitance 109 so that it remains charged to the desired level. This may be reflected by a value of $V_L$ (while the secondary winding 105 is conducting current) to be slightly below the reference voltage $V_{REF}$. In turn, this may be reflected by an error voltage $V_E$ that is positive, as reflected by the positive value of $V_E$ in FIG. 3 during a moderate-to-heavy load.

At some point during the pulsing cycle of the converter shown in FIG. 1, the load current $I_L$ through the secondary winding 105 may stop flowing. The circuit generating the load current zero crossing voltage $V_Z$ (not shown) may then detect this and cause $V_Z$ to rise, as reflected by a rising edge 301 in FIG. 3. The rising edge 301 of $V_Z$ may cause the Q output of the latch circuit 215 and thus $V_P$ to rise, as reflected by a rising edge 303 in FIG. 3.

The rising edge 303 of $V_P$ may cause the transistor 111 to turn on, thus causing the amount of current in the primary winding 103 to rise, as reflected by a rising slope 305 of the level-shifted voltage $V_{LIP}$ that is representative of the primary current $I_P$.

After the level shifted voltage $V_{LIP}$ exceeds $V_E$, as shown at a point 307 in FIG. 3, the reset on the R input to the latch circuit 215 may be activated, as reflected by a rising edge 309. In turn, this may reset the latch circuit 215, as reflected by a falling edge 311 of the pulse voltage $V_P$. At this point, the transistor 111 may open, interrupting the current flow in the primary winding 103, as reflected by a falling edge 313 of $V_{LIP}$.

Load current $I_L$ may then start flowing in the secondary winding 105 and may continue to flow until all of the energy that was placed into the transformer 101 from the pulse in the primary winding 103 is transferred to the capacitance 109 and/or the load (not shown). At this point, the load current $I_L$ in the secondary winding 105 may cease, causing the load current zero crossing voltage $V_Z$ to again rise, as reflected by a rising edge 315. The processes that have just been described in connection with the various wave forms may then repeat while there a moderate-to-heavy load continues to be placed on the flyback converter, as illustrated in FIG. 3.

During a moderate-to-heavy load, the flyback converter that has thus-far been described may be operating in what is often referred to as a boundary mode. Each pulse to the switching circuit that controls delivery of energy into the primary winding 103 may be initiated immediately following the cessation of load current $I_L$ in the secondary winding 105. The current in the primary winding 103 then grows in proportion to the error between the desired reference voltage $V_{REF}$ and the actual load voltage $V_L$, thus supplying an amount of energy into the transformer 101 that may be proportional to the error voltage $V_E$. This mode is often referred to as the boundary mode because it lies on the boundary between when current is flowing continuously in either the primary winding 103 or the secondary winding 105 of the transformer 101 and when there are periods of discontinuity in that current flow.

The load on the converter may change to a light load, as reflected by a falling edge 316. When this happens, the circuitry shown in FIGS. 1 and 2 may cause the timing of state changes in the signals that have been discussed to change, as reflected in FIG. 3 and as will now be discussed in greater detail.

If the change to a light load occurs during the delivery of energy into the primary winding 103, as shown in FIG. 3, the change in the timing of the signals may not be immediate. This may be attributable to the fact that the circuitry shown in FIGS. 1 and 2 may not yet realize that there has been a change in the load. It may not know this because current is not flowing in the secondary winding 105 at this time. The circuitry may not be able to sense any change in the output voltage $V_O$ that is likely to result from the decrease in current until current again flows in the secondary winding 105.

As soon as the transistor 111 again opens and the primary current $I_P$ ceases, as reflected by a falling edge 317, the value of the load voltage $V_L$ may reflect that the value of the output voltage $V_O$ has risen substantially, reflecting a substantial reduction in the load current $I_L$. Since the load voltage $V_L$ is being fed into the inverting input of the error amplifier 201, this may be reflected by a sharp drop in the error voltage $V_E$, as reflected by the falling edge 319 in FIG. 3.

Eventually, the charge that was delivered into the transformer 101 may be transferred to the capacitance 109 and/or the load (not shown), resulting in a cessation of the current through the secondary winding 105. In turn, this may cause the load current zero crossing voltage $V_Z$ to rise, as reflected by a rising edge 321.

At this time, however, the load voltage $V_L$ may still be higher than the reference voltage $V_{REF}$, causing the error voltage $V_E$ to remain below the level-shifted voltage $V_{LIP}$. As a consequence, the reset voltage $V_R$ to the reset input R of the latch circuit 215 may still be high, preventing the Q output of the latch circuit 215 from rising and, as a consequence, causing the pulse voltage $V_P$ to remain in its off state.

At the same time, the resistance 207 may be steadily bleeding the charge off of the sample and hold capacitance 205, causing the error voltage $V_E$ to gradually rise, as reflected by a rising slope 322. Ultimately at a point 323, the error voltage $V_E$ may again be greater than the level-shifted voltage $V_{LIP}$ that is representative of the current through the primary winding 103, causing the reset voltage $V_R$ to fall, as reflected by a falling edge 325 and, in turn, the pulse voltage $V_P$ to rise, as reflected by a rising edge 327.

The level-shifted voltage $V_{LIP}$ may then quickly again exceed the error voltage $V_E$, causing the reset voltage $V_R$ to rise, as reflected by a rising edge 329. In turn, this may cause the voltage pulse $V_P$ to fall, as reflected by a falling edge 331.

The net effect of this timing sequence may be to substantially lengthen the off time 333 of the voltage pulse $V_P$ during a light load, as compared to its off time 335 during a moderate-to-heavy load. The period of each pulse may similarly be lengthened, as evident from a comparison of a period 337 of the voltage pulses $V_P$ during a light load with a period 339 of the voltage pulses $V_P$ during a moderate-to-heavy load.

Because of inherent delays and other attributes of the circuitry, it may be difficult to reduce the length of the on time for a pulse to the primary winding 103 below a certain amount. The only other way to avoid a runaway output voltage $V_O$ under light loads may therefore be to increase the period of the pulses, as has been done by the circuitry discussed above.

The amount by which both the off time 333 and the period 337 of each pulse are increased during a light load may be in proportion to the voltage error $V_E$. The increase may also be in an amount that is other than an integer multiple of the period 339 or of the off time 335 of each pulse.

The RC time constant established by the capacitance 205 and the resistance 207 may affect the length of the increase in the off time and the period during a light load. Selecting a long time constant may cause the length between refreshment pulses to be long, thus allowing the converter to maintain regulation under very light loads. However, a long time constant may also reduce the frequency at which the converter receives updates on the output voltage $V_O$, thus decreasing its ability to respond quickly to load changes. The time constant established by the selection of the capacitance 205 and the resistance 207, therefore, may represent a compromise between being able to regulate very light loads and being able to respond to load changes quickly. The gain of the error amplifier 201 as established by the compensator 203 and the amount of level shift caused by the level shift circuit 211 may also affect the amount by which the period and off time of the pulses are increased during light loads and may be selected based on the same or similar considerations.

Figure 4:
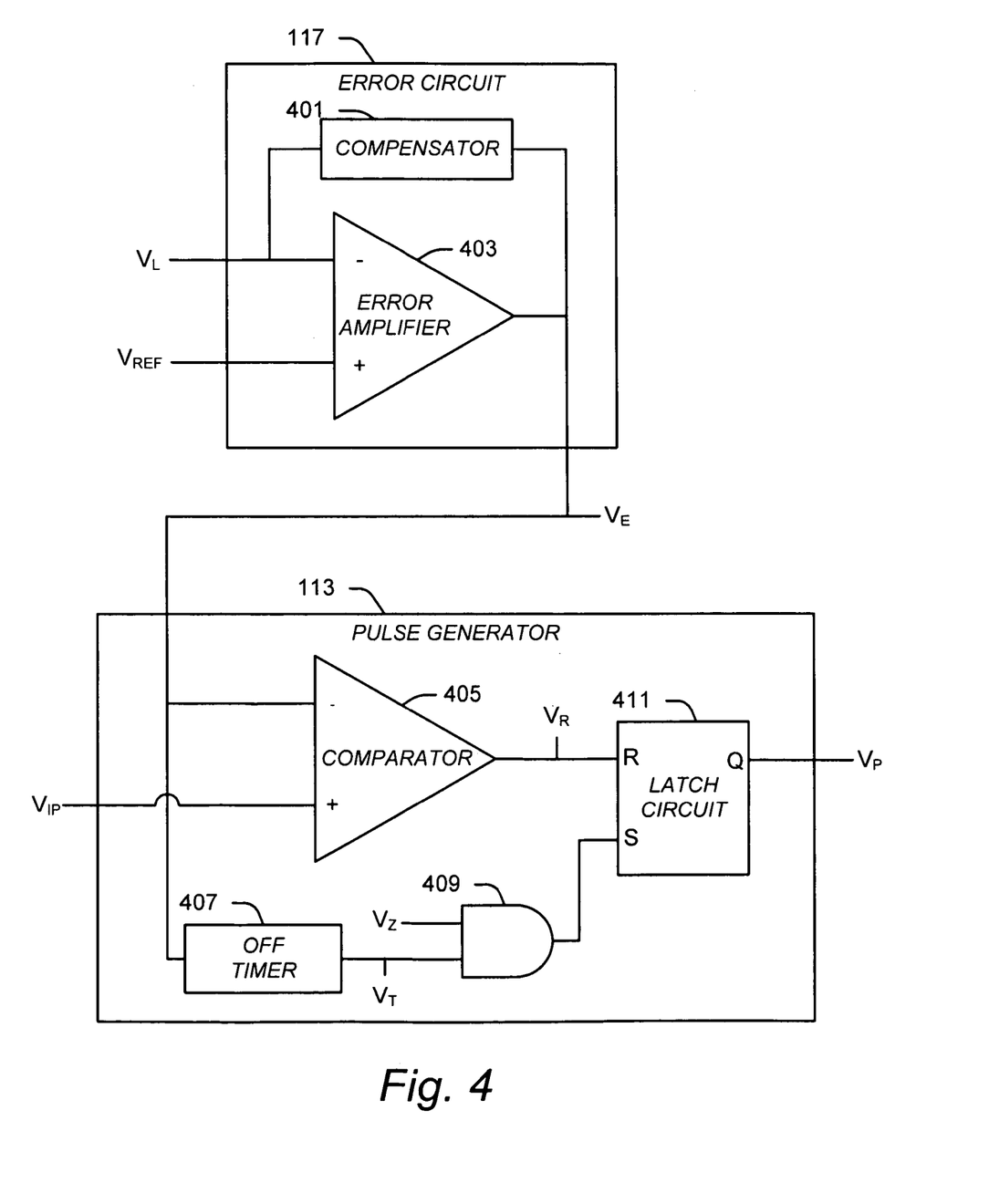
FIG. 4 illustrates an alternate embodiment of components that may be used for portions of the isolated flyback converter illustrated in FIG. 1.

FIG. 4 illustrates an alternate embodiment of components that may be used for portions of the isolated flyback converter illustrated in FIG. 1. As shown in FIG. 4, the error circuit 117 may include a compensator 401 and an error amplifier 403. The pulse generator 113 may include a comparator 405, an off timer 407, an AND gate 409 and a latch circuit 411.

With the exception of the off timer 407 and the AND gate 409, the components shown in FIG. 4 may be of the same or similar to those discussed above in connection with FIG. 2. One difference, however, may be in connection with the off timer 407 and the AND gate 409.

The off timer 407 may be configured to provide a high output at all times when the output of the comparator 405 is low or the error voltage $V_E$ is above a threshold value. After the output of the comparator 405 goes high and $V_E$ falls below this threshold value, the off timer 407 may be configured to go low for a period of time that is approximately proportional to the magnitude of the error voltage $V_E$.

Figure 5:
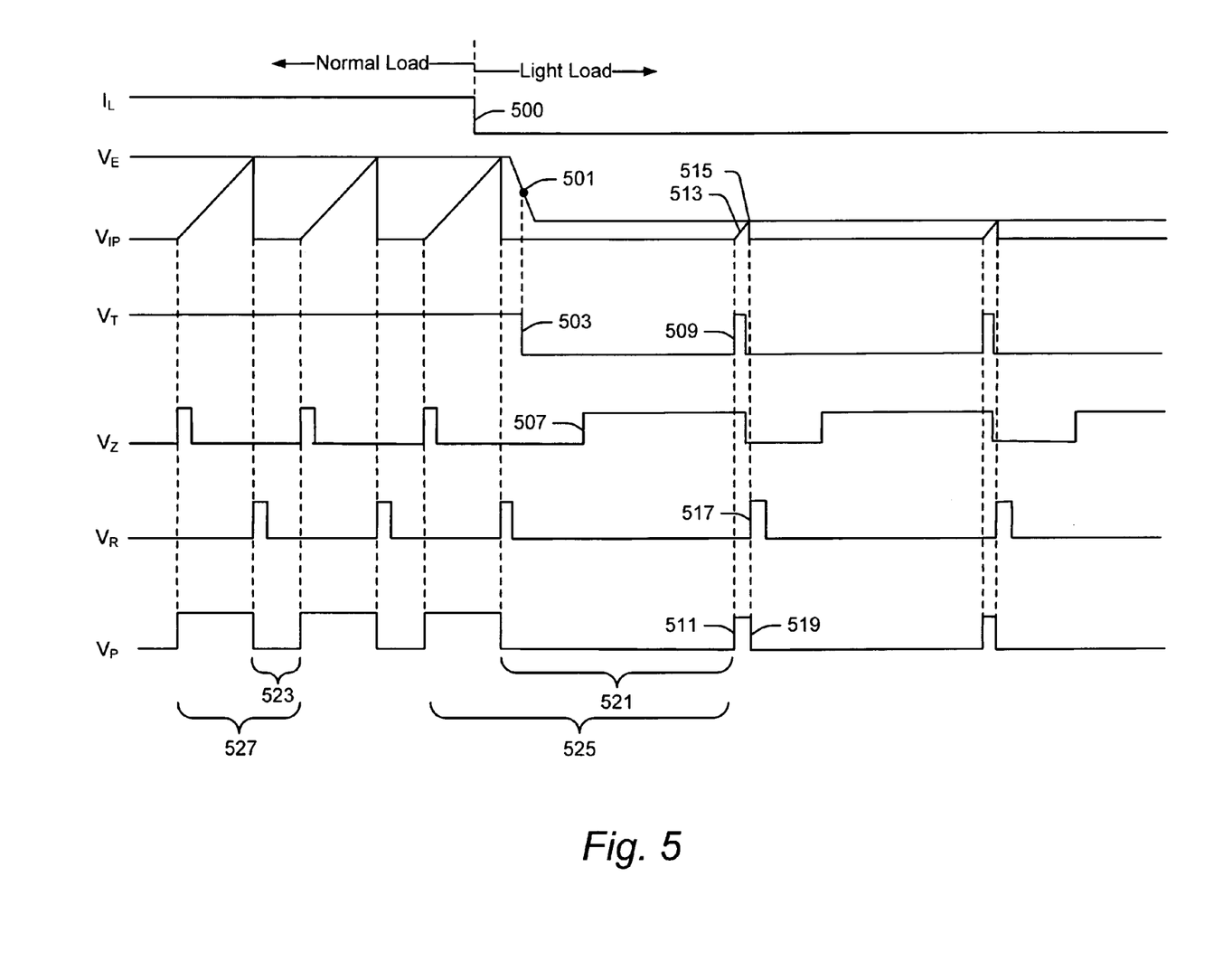
FIG. 5 illustrates signals that may be found in one or more of the circuits illustrated in FIGS. 1 and 4.

FIG. 5 illustrates signals that may be found in one or more of the circuits illustrated in FIGS. 1 and 4. Except as described below, these signals may have substantially the same timing and follow substantially the same pattern as the signals described above in connection with FIGS. 1, 2, and 3. During a moderate-to-heavy load, for example, the signals shown in FIG. 5 may be substantially the same as those shown in FIG. 3. Even after a light load is initially presented, as reflected by the falling edge 500, the timing of the signals may still be substantially the same, as the circuitry may still not have any information from which to be alerted to the change in the load.

After the light load is applied and after the load current $I_L$ stops flowing in the secondary winding 105, however, the error voltage $V_E$ may drop, as shown by a falling slope 501. It may continue to drop until it falls below the threshold trigger value for the off timer 407 at which point, because the output from the comparator 405 is still high, the off timer may initiate an off pulse, as reflected by a falling edge 503 on $V_T$.

While the timer voltage $V_T$ is low, the current through the secondary winding 105 may cease, causing the load current zero-crossing voltage $V_Z$ to rise, as shown by a rising edge 507. Because the timer voltage $V_T$ is still low, however, the rising edge of the zero-crossing voltage $V_Z$ may not cause any change in the state of the latch circuit 411. Once the off timer 407 times out and again goes high, as reflected by a rising edge 509 of the timer voltage $V_T$, the latch circuit 411 may be set, as reflected by a rising edge 511 on the pulse voltage $V_P$. This may cause the transistor 111 to turn on, thus causing current to flow in the primary winding 103, as reflected by a rising slope 513 on the voltage $V_{IP}$. After $V_{IP}$ exceeds the error voltage $V_E$, as reflected by a point 515, the output of the comparator 405 may go high, resetting the latch circuit 411, as reflected by a rising edge 517 of the reset voltage $V_R$. In turn, this may cause the pulse voltage $V_P$ to go low, as reflected by a falling edge 519.

This process may repeat for so long as the load is light, as partially reflected in FIG. 5.

Although there are differences in the circuitry between FIGS. 2 and 4 and the timing between FIGS. 3 and 5, the overall effect may be similar. During a light load, an off time of the voltage pulse $V_P$ may be increased, as reflected by a comparison of an off time 521 with an off time 523. Similarly, a period of the voltage pulse $V_P$ during a light load may be increased, as reflected by a comparison of a period 525 with a period 527. The amount of the increases may be regulated by adjusting the amount of off time generated by the off timer 407.

The isolated flyback converter need not always operate in the boundary mode during moderate-to-heavy loads. Instead, a fixed-frequency clock signal may be substituted for the load current zero-crossing voltage $V_Z$. During moderate-to-heavy loads, the voltage pulse $V_P$ in this embodiment may always rise at a fixed, periodic frequency. Also during moderate-to-heavy loads, the voltage pulse $V_P$ may fall during each cycle at such time as the circuitry has determined that the correct amount of energy has been injected into the transformer 101, based on the magnitude of the error voltage $V_E$. This type of pulse control is commonly referred to as pulse width modulation ("PWM").

During light loads, however, the circuitry may increase both the off time and the period of the pulses to effectuate better light load regulations, as described above in connection with a boundary mode converter.

Although having thus-far described the circuitry as always increasing both the off time and the period of the pulses during light loads, the circuitry may instead increase only the off time or the period of the pulses under all or certain types of light loads.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The term "coupled" encompasses both direct and indirect coupling. For example, the term "coupled" encompasses the presence of intervening circuitry between two points that are coupled.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage, or equivalent to the public, regardless of whether it is recited in the claims.

We claim:

1. A regulator for an isolated flyback converter having a transformer with a primary winding and a secondary winding and a switching circuit for controllably delivering energy into the primary winding in response to pulses, the regulator comprising:
    a load voltage sensing circuit configured to generate a feedback signal representative of output voltage from the isolated flyback converter based on voltage across the primary winding of the transformer;
    an error circuit configured to compare the feedback signal representative of output voltage to a reference signal and to output an error signal based on the difference between the feedback signal and the reference signal; and
    a pulse generator configured to controllably generate the pulses and to increase at least one off time and at least one period of the pulses after the error signal decreases below a threshold, but not to increase the period of the pulses before the error signal decreases below the threshold, when the magnitude of the error signal decreases.

2. The regulator of claim 1 wherein the pulse generator is configured to increase the at least one off time and period after the feedback signal becomes greater than a reference signal.

3. The regulator of claim 2 wherein the pulse generator is configured to increase the at least one off time and period as a function of the difference between the reference signal and the feedback signal.

4. The regulator of claim 3 wherein the pulse generator is configured to increase the at least one off time and period substantially in proportion to the difference between the reference signal and the feedback signal.

5. The regulator of claim 2 wherein the regulator is configured to generate a primary current signal that is a function of current though the primary winding and wherein the pulse generator is configured to change state when the primary current signal becomes substantially the same as the difference between the reference signal and the feedback signal.

6. The regulator of claim 5 wherein the regulator is configured to cause the primary current signal to be proportional to the current thought the primary winding, but offset in level.

7. The regulator of claim 1 wherein the pulse generator is configured to limit increases in the off time of the pulses to a maximum amount.

8. The regulator of claim 1 wherein the pulse generator is configured to initiate each of the pulses before the error signal decreases below the threshold when current though the secondary winding ceases.

9. The regulator of claim 1 wherein the pulse generator is configured to initiate each of the pulses before the error signal decreases below the threshold approximately on a fixed period basis, which period does not change as a function of changes in the error signal.

10. The regulator of claim 1 wherein the pulse generator includes a latch circuit configured to generate the pulses.

11. The regulator of claim 1 wherein the pulse generator includes an off timer configured to generate a signal that regulates the off time of the pulses after the error signal decreases below the threshold.

12. The regulator of claim 11 wherein the off timer is configured not to regulate the off time of the pulses before the error signal decreases below the threshold.

13. A regulator for an isolated flyback converter having a transformer with a primary winding and a secondary winding and a switching circuit for controllably delivering energy into the primary winding in response to pulses, the regulator comprising:
    means for generating a feedback signal representative of output voltage from the isolated flyback converter based on voltage across the primary winding of the transformer;
    means for comparing the feedback signal representative of output voltage to a reference signal and for outputting an error signal based on the difference between the feedback signal and the reference signal; and
    means for controllably generating the pulses and to increase at least one off time and at least one period of the pulses after the error signal decreases below a threshold, but not to increase the period of the pulses before the error signal decreases below the threshold, when the magnitude of the error signal decreases.

14. A regulator for a flyback converter having a transformer with a primary winding and a secondary winding and a switching circuit for controllably delivering energy into the primary winding in response to pulses, the regulator comprising a pulse generator configured to initiate the pulses approximately when current through the secondary winding ceases during various different heavy loads on the flyback converter and to increase at least one off time and at least one period-of the pulses and not to initiate the pulses approximately when current through the secondary winding ceases during various different lighter loads on the flyback converter.

15. The regulator of claim 14 wherein the pulse generator is configured to increase the at least one off time and period when a feedback signal is greater than a reference signal.

16. The, regulator of claim 15 wherein the pulse generator is configured to increase the at least one off time and period as a function of the difference between the reference signal and the feedback signal.

17. The regulator of claim 16 wherein the pulse generator is configured to increase the at least one off time and period substantially in proportion to the difference between the reference signal and the feedback signal.

18. The regulator of claim 17 wherein the regulator is configured to generate a primary current signal that is a function of current though the primary winding and wherein the pulse generator is configured to change state when the primary current signal becomes substantially the same as the difference between the reference signal and the feedback signal.

19. The regulator of claim 18 wherein the regulator is configured to cause the primary current signal to be proportional to the current thought the primary winding, but offset in level.

20. The regulator of claim 14 wherein the pulse generator is configured to limit increases in the off time of the pulses to a maximum amount.

21. The regulator of claim 14 wherein the pulse generator includes a latch circuit configured to generate the pulses.

22. The regulator of claim 14 wherein the pulse generator includes an off timer configured to generate a signal that regulates the off time of the pulses after the load decreases.

23. The regulator of claim 22 wherein the off timer is configured not to regulate the off time of the pulses before the load decreases.

24. A regulator for a flyback converter having a transformer with a primary winding and a secondary winding and a switching circuit for controllably delivering energy into the primary winding in response to pulses, the regulator comprising means for initiating the pulses approximately when current though the secondary winding ceases during various different heavy loads on the flyback converter and to increase at least one off time and at least one period-of the pulses and not to initiate the pulses approximately when current though the secondary winding ceases during various different lighter loads on the flyback converter.

25. A regulator for an isolated flyback converter having a transformer with a primary winding and a secondary winding and a switching circuit for controllably delivering energy into the primary winding in response to pulses, the regulator comprising:
    a load voltage sensing circuit configured to generate a feedback signal representative of output voltage from the isolated flyback converter while being electrically isolated from the secondary winding; and
    a pulse generator configured to controllably initiate the pulses during heavy loads on the flyback converter that has a period that does not vary as a function of the heavy load, and to increase at least one off time and at least one period of the pulses in an amount that is substantially other than an integer multiple of the fixed periodid during lighter loads on the flyback converter.

26. The regulator of claim 25 wherein the pulse generator is configured to increase the at least one off time and period when a feedback signal is greater than a reference signal.

27. The regulator of claim 26 wherein the pulse generator is configured to increase the at least one off time and period as a function of the difference between the reference signal and the feedback signal.

28. The regulator of claim 27 wherein the pulse generator is configured to increase the at least one off time and period substantially in proportion to the difference between the reference signal and the feedback signal.

29. The regulator of claim 25 wherein the pulse generator is configured to limit increases in the off time of the pulses to a maximum amount.

30. A regulator for an isolated flyback converter having a transformer with a primary winding and a secondary winding and a switching circuit for controllably delivering energy into the primary winding in response to pulses, the regulator comprising:

means for generating a feedback signal representative of output voltage from the isolated flyback converter while being electrically isolated from the secondary winding; and means for controllably initiating the pulses during heavy loads on the flyback converter that has a period that does not vary as a function of the heavy load, and to increase at least one off time and at least one period of the pulses in an amount that is substantially other than an integer multiple of the fixed periodic during lighter loads on the flyback converter.

* * * * *